(12) United States Patent
Akutsu et al.

(10) Patent No.: US 8,684,411 B2
(45) Date of Patent: Apr. 1, 2014

(54) IMPACT ABSORBING STEERING APPARATUS

(75) Inventors: Naoto Akutsu, Gunma (JP); Makoto Nagasawa, Gunma (JP)

(73) Assignee: NSK, Ltd. (JP)

( * ) Notice: Subject to any disclaimer, the term of this patent is extended or adjusted under 35 U.S.C. 154(b) by 0 days.

(21) Appl. No.: 13/256,709

(22) PCT Filed: Jul. 25, 2011

(86) PCT No.: PCT/JP2011/066881
§ 371 (c)(1),
(2), (4) Date: Feb. 28, 2012

(87) PCT Pub. No.: WO2012/026259
PCT Pub. Date: Mar. 1, 2012

(65) Prior Publication Data
US 2012/0234623 A1    Sep. 20, 2012

(30) Foreign Application Priority Data

Aug. 26, 2010   (JP) .................................. 2010-189082

(51) Int. Cl.
B62D 1/11           (2006.01)
(52) U.S. Cl.
USPC ........................................................ 280/777
(58) Field of Classification Search
USPC ........................................................ 280/777
See application file for complete search history.

(56) References Cited

U.S. PATENT DOCUMENTS

| | | | | |
|---|---|---|---|---|
| 5,961,146 A * | 10/1999 | Matsumoto et al. | ........... | 280/777 |
| 6,170,873 B1 * | 1/2001 | Jurik et al. | ..................... | 280/777 |
| 6,170,874 B1 * | 1/2001 | Fosse | ............................. | 280/777 |
| 6,224,104 B1 * | 5/2001 | Hibino | .......................... | 280/777 |
| 6,234,528 B1 * | 5/2001 | Ben-Rhouma et al. | ........ | 280/777 |
| 7,240,922 B2 * | 7/2007 | Nakano et al. | ................ | 280/777 |
| 7,328,631 B2 * | 2/2008 | Murakami et al. | ............. | 74/493 |
| 7,384,070 B2 * | 6/2008 | Sato et al. | ..................... | 280/777 |

(Continued)

FOREIGN PATENT DOCUMENTS

| | | |
|---|---|---|
| JP | 09-024843 | 1/1997 |
| JP | 09-272448 | 10/1997 |
| JP | 10-167083 | 6/1998 |
| JP | 2000-38141 | 2/2000 |

(Continued)

Primary Examiner — Drew Brown
(74) Attorney, Agent, or Firm — Hartman Global IP Law; Gary M. Hartman; Domenica N. S. Hartman

(57) ABSTRACT

Construction is achieved wherein the rear section of a steering column 6a can be prevented from displacing upward regardless of the occurrence of a secondary collision, and thus can effectively protect the driver. Capsules 28 are supported by a bracket on the vehicle body side. An installation plate section 14b of a bracket 13 on the housing side is held between a top plate section 29 and bottom plate section 30 of each of the capsules 28 so that the installation plate section 14b can displace in the forward direction during a secondary collision. The top and bottom plate sections 29, 30 extend forward to a position where they can support the installation plate section 14b even when the bracket 13 on the housing side has displaced in the forward direction due to a secondary collision. Alternatively, a suspended arm that functions in the same way is provided on the bracket on the vehicle body side.

3 Claims, 10 Drawing Sheets

(56) References Cited

U.S. PATENT DOCUMENTS

| | | | |
|---|---|---|---|
| 8,382,156 B2* | 2/2013 | Akutsu et al. | 280/777 |
| 2002/0167157 A1* | 11/2002 | Matsumoto et al. | 280/777 |
| 2004/0195811 A1* | 10/2004 | Imamura et al. | 280/735 |
| 2005/0173912 A1 | 8/2005 | Nakano et al. | |
| 2006/0186658 A1* | 8/2006 | Yasuhara et al. | 280/775 |
| 2007/0069513 A1* | 3/2007 | Kirihara et al. | 280/775 |
| 2007/0080006 A1 | 4/2007 | Yamaguchi | |
| 2012/0112443 A1* | 5/2012 | Arakawa et al. | 280/777 |

FOREIGN PATENT DOCUMENTS

| | | |
|---|---|---|
| JP | 2000-142426 | 5/2000 |
| JP | 2002-59853 | 2/2002 |
| JP | 2004-074985 | 3/2004 |
| JP | 2005-417319 | 2/2005 |
| JP | 2006-111090 | 4/2006 |

* cited by examiner

IMPACT ABSORBING STEERING APPARATUS

TECHNICAL FIELD

The present invention relates to an impact absorbing steering apparatus that is capable of absorbing impact energy that is applied to a steering wheel from the body of a driver during a collision accident, while the steering wheel displaces in the forward direction, and particularly to an impact absorbing steering apparatus having construction wherein an electric motor of an electric power steering apparatus is located in the front end section of a portion that displaces in the forward direction together with the steering wheel.

BACKGROUND ART

As illustrated in FIG. 6, the steering apparatus of an automobile is constructed such that it applies a steering angle to the front wheels by transmitting the rotation of a steering wheel 1 to an input shaft 3 of a steering gear unit 2, and pushing or pulling a pair of left and right tie rods 4 as the input shaft 3 rotates. The steering wheel 1 is supported by and fastened to the rear end section of a steering shaft 5, and with the steering shaft 5 passed in the axial direction through a cylindrical shaped steering column 6, the steering shaft 5 is supported by this steering column 6 such that it can rotate freely. The front end section of the steering shaft 5 is connected to the rear end section of an intermediate shaft 8 via a universal joint 7, and the front end section of the intermediate shaft 8 is connected to the input shaft 3 via a separate universal joint 9. The intermediate shaft 8 is constructed such that it is capable of transmitting torque, and such that its entire length can be contracted by an impact load. During a collision accident, regardless of backward displacement of the steering gear unit 2, due to contraction of the intermediate shaft 8, the steering wheel 1 is prevented from displacing toward the rear with the steering shaft 5 and thus from being pressed up against the body of the driver.

During a collision accident, it is required for this kind of steering wheel apparatus for an automobile to have construction that causes the steering wheel to displace in the forward direction as it absorbs impact energy so as to protect the driver. In other words, during a collision accident, after a primary collision of an automobile with another automobile, a secondary collision occurs in which the body of the driver hits the steering wheel 1. Technology has been conventionally employed, as disclosed in Patent Literatures 1 to 3, in which the impact applied to the body of the driver during this secondary collision is lessened by supporting the steering column 6 that supports the steering wheel 1 with respect to the vehicle body so that the steering column 6 drops away toward the front due to the impact load of this secondary collision, and by providing an energy absorbing member, which absorbs an impact load by deforming plastically, between a portion that displaces in the forward direction together with the steering column 6 and the vehicle body.

Patent Literature 4 discloses construction in which an electric power steering apparatus is installed on the front end section of the steering column, and where this steering column and a housing of this electric power steering apparatus are supported independently of each other by a portion that is fastened to the vehicle body such that they are capable of dropping away to the front due to an impact load. FIG. 7 and FIG. 8 illustrate an example of this kind of conventional construction in which the steering column and housing are supported independently of each other by the vehicle body.

A housing 10 that houses component parts such as a reduction gear of the electric power steering apparatus is fastened to the front end section of the steering column 6a. A steering shaft 5a is supported on the inside of the steering column 6a such that the steering shaft 5a can only rotate freely, and the steering wheel 1 (see FIG. 6) is fastened to a portion of the rear end section of the steering shaft 5a that protrudes from the opening on the rear end of the steering column 6a. The steering column 6a and housing 10 are supported by a bracket 11 on the vehicle side, which corresponds to the portion fastened to the vehicle body (see FIG. 4 and FIG. 5) such that they are capable of dropping away toward the front due to an impact load in the forward direction.

In order for this, a bracket 12 on the column side that is supported in the middle section of the steering column 6a, and a bracket 13 on the housing side that is supported by the housing 10 are supported by the vehicle body so that both of these drop away to the front due to an impact load in the forward direction. These brackets 12, 13 both are provided with installation plate sections 14a, 14b at one or two locations respectively, and cut out sections 15a, 15b are formed in this installation plate sections 14a, 14b with opened at the rear end edge of these sections 14a, 14b. In a state covering these cut out sections 15a, 15b, sliding plates 16a, 16b are attached to portions near both the left and right ends of these brackets 12, 13.

These sliding plates 16a, 16b are each formed by bending a thin metal plate such as carbon steel plate or stainless steel plate that is covered on the surface with a layer of synthetic resin such as polyimide resin (nylon) or polytetrafluoroethylene resin into a U shape, such that a connecting plate section connects the rear end edges of top and bottom plate sections. A through hole for inserting a bolt or stud is formed in portions of the top and bottom plate sections that are aligned with each other. With the sliding plates 16a, 16b mounted on the installation plate sections 14a, 14b, these through holes are aligned with the cut out sections 15a, 15b that are formed in the installation plate sections 14a, 14b. With regard to the sliding plate 16b which is mounted on the installation plate section 14b of the bracket 13 on the housing side, a restraining piece that is formed by bending a tab which is formed on the front end edge of the top plate of the sliding plate 16b downward or by bending a tab which is formed on the front end edge of the bottom plate of the sliding plate 16b upward, is engaged with the front end edge of the installation plate section 14b, such that the sliding plate 16b is prevented from accidentally dropping away from the installation plate section 14b before the installation to the bracket 11 on the vehicle side.

These brackets 12, 13 are supported by the bracket 11 on the vehicle side by inserting a bolt or stud through the cut out sections 15a, 15b in the installation plate sections 14a, 14b and the through holes 16a, 16b in the sliding plates 16a, 16b and screwing the bolts into the nuts and tightening. During a secondary collision, the bolt or stud comes out from the cut out sections 15a, 15b together with the sliding plates 16a, 16b, which allows the steering column 6a and housing 10 to displace in the forward direction together with the brackets 11, 12 and steering wheel 1.

In the case of the example in the figures, an energy absorbing member 20 as illustrated in FIG. 9 is located between the bolt or stud and the bracket 12 on the column side. As the bracket 12 on the column side displaces in the forward direction, this energy absorbing member 20 plastically deforms, which absorbs the impact energy that is transmitted from the steering wheel 1 to the bracket 12 on the column side via the steering shaft 5b and steering column 6a. The energy absorbing member 20 is basically the same as that disclosed in Patent Literature 1, which is formed by bending a plastically deformable metal plate such as mild steel plate, and comprises a base plate section 21 and a plastically deforming section 22. A circular hole 23 is formed in the center section of the base plate section 21 for inserting the bolt or stud. Moreover, two locations on both end sections in the width direction of the rear end edge of the base plate section 21 are bent upward to form restraining pieces 24, and the front surfaces of these restraining pieces 24 engage with the rear end edge of the sliding plate 16a that is mounted on the installation plate section 14a of the bracket 12 on the column side. These restraining pieces 24 are provided for positioning the base plate section 21 with respect to the sliding plate 16a. Furthermore, the plastically deforming sections 22 are formed by bending back the middle section of the band shaped plate section that extends forward from the center section of the front end edge of the base plate section 21 downward and toward the rear 180° into a U shape.

The base plate sections 21 of the energy absorbing members 20 having this kind of construction are supported by bolts or studs, and are connected to the vehicle body in a state where displacement in the forward direction is prevented. The tip end edges of the plastically deforming sections 22 engage with the bracket 12 on the column side where the installation plate sections 14a are located. Anchor plate sections 25 for coming in contact with the tip end edges of the plastically deforming sections 22 are formed by bending in a portion situated below the installation plate sections 14a on both the left and right sides of the bracket 12 on the column side. The anchor plate sections 25 is formed by bending the rear end section of the bottom plate section located on the lower portion of the installation plate section 14a upward, and the plastically deforming section 22 of the energy absorbing member 20 is arranged in a space between the bottom surface of the installation plate section 14a and the top surface of the bottom plate section.

During a secondary collision, the bolts or studs come out from the cut out sections 15a together with the sliding plates 16a and the base plate sections 21 of the energy absorbing members 20, which allows the bracket 12 on the column side to displace in the forward direction. The steering column 6a also displaces in the forward direction together with the bracket 12 on the column side. When this happens, the bracket 13 on the housing side also drops away from the vehicle, which allows this bracket 13 on the housing side to displace in the forward direction. As the bracket 12 on the column side displaces in the forward direction, the plastically deforming sections 22 of the energy absorbing members 20 plastically deform from the state illustrated in FIG. 8 to the state illustrated in FIG. 10 in a direction that causes the bent back section of that is formed in the middle section of the band shaped plate section to move toward the tip end side of this band shaped plate section. The plastic deformation absorbs the impact energy that is transmitted from the body of the driver to the bracket 12 on the column side by way of the steering shaft 5a and the steering column 6, which lessens the impact applied to the body of the driver.

In the example illustrated in the figure, a tilting mechanism is installed for adjusting the vertical position of the steering wheel 1. In order for this, the bracket 13 on the housing side is formed in a gate like shape and is provided with a pair of left and right support plate sections 17 vertically extending from both the left and right end sections thereof, and the bottom end sections of the left and right support plate sections 17 are supported by the housing 10 by a pair of concentric left and right pivot sections 18 such that pivoting is possible. The steering column 6a is supported by the bracket 12 on the column side so that it can raise and lower along long holes that are formed in a partial arc shape around these pivot sections 18. When adjusting the vertical position of the steering wheel 1, a tilt lever 19 is rotated downward, and with the force for supporting the steering column by the bracket 12 on the column side lowered or eliminated, the steering column 6a is pivoted around the pivot sections 18. Then, with the steering wheel 1 moved to a desired position, the tilt lever 19 is rotated upward, and the force for supporting the steering column 6a by the column bracket 12 is restored.

In the case of the construction illustrated in FIG. 7 and FIG. 8, in addition to the electric motor 26 being fastened to and supported by the housing 10 that is fastened to the front end section of the steering column 6a, many parts such as a torque sensor are housed inside the housing in addition to the reduction gear, to form an electric power steering apparatus 27. This electric power steering apparatus 27 is heavy, so by providing a bracket 13 on the housing side, this electric power steering apparatus 27 is supported by the bracket 11 on the vehicle side separately from the steering column 6a. Incidentally, as a secondary collision occurs, during the process of the housing 10 displacing in the forward direction together with this steering column 6a, after the force for supporting the housing 10 by the bracket 11 on the vehicle side is lost, the rear section of this steering column 6a easily displaces upward. The reason for the rear section of this steering column 6a easily displacing in the upward direction when a secondary collision occurs is because of the following two forces (1) and (2).

(1) In the case of an actual steering apparatus, the steering column 6a is located in an inclined state in a direction upward going toward the rear. During a secondary collision, an impact load is applied to the steering wheel 1 in nearly the forward direction, so in addition to the force component in the forward direction along the center axis of the steering column 6a, a force component is applied in the upward direction, in a direction orthogonal to the center axis.

(2) The heavy electric power steering apparatus 27 that is supported by the front end section of the steering column 6a works as a force that causes the front end section of the steering column 6a to lower. On the other hand, in this state, by the installation plate sections 14a being supported by the energy absorbing members 20, this steering column 6a is in a state of being able to pivot around the bracket 12 on the column side. Therefore, the weight of the electric power steering apparatus 27 works as a force causing the rear end section of the steering column 6a to displace upward.

As illustrated in FIG. 10, when the force for supporting the bracket 13 on the housing side by the bracket 11 on the vehicle side is lost as a secondary collision occurs, the steering column 6a becomes tilted more than the original angle of inclination due to the forces of (1) an (2) above. In other words, the rear end section of the steering column 6a displaces upward more than the original position, and the front end section similarly displaces downward. On the other hand, during a secondary collision, displacement in the forward direction of the steering column 6a is performed as the plurality of locations of friction fit are caused to slide, and the energy absorbing members 20 are caused to plastically deform. The sliding of these areas of friction fit, and the plastic deformation of the energy absorbing members 20 are designed to be performed effectively when the steering column 6a displaces in the axial direction. In other words, as illustrated in FIG. 10, displacement of the steering column in the forward direction as is in an inclined state is disadvantageous from the aspect of completely protecting the driver. Moreover, this is also disadvantageous from the aspect of the difficulty of design for properly maintaining a positional relationship between an airbag that inflates at the rear of the steering wheel 1 and the body of the driver.

RELATED LITERATURE

Patent Literature

[Patent Literature 1] Japanese Patent Application Publication No. H09-24843
[Patent Literature 2] Japanese Patent Application Publication No. H09-272448
[Patent Literature 3] Japanese Patent Application Publication No. H10-167083
[Patent Literature 4] Japanese Patent Application Publication No. 2004-74985

SUMMARY OF THE INVENTION

Problem to be Solved by the Invention

Taking into consideration the conditions described above, the object of the present invention is to provide construction that is capable of effectively protecting the driver by preventing the rear section of the steering column from displacing in the upward direction, regardless of a secondary collision, even in the case of construction in which the housing of an electric power steering apparatus, which is located at the front end section of the steering column, drops away from a portion that fastened to the vehicle body during a secondary collision.

The impact absorbing steering apparatus comprising an electric power steering apparatus of the present invention comprises a steering column, a steering shaft, a bracket on the column side, an electric power steering apparatus and a bracket on the housing side.

The steering column is supported by a vehicle body. The steering shaft is supported on the inside of the steering column such that it rotates freely, and is capable of supporting and fastening to a steering wheel on the rear end section that protrudes from the opening on the rear end of the steering column. The bracket on the column side is supported by the steering column, and fastens this steering column to a vehicle body so that the steering column can displace in the axial direction during a secondary collision. The electric power steering apparatus comprises a housing that is supported by the front end section of the steering column, and an electric motor that is supported by and fastened to the housing, wherein the electric motor functions as a power source that provides auxiliary torque for rotating the steering shaft.

Moreover, the bracket on the housing side comprises an installation plate section on the housing side that is connected to a portion that is fastened to the vehicle body so that the installation plate section can drop away toward the front due to an impact load in the forward direction, and is supported by the housing and fastens this housing to the vehicle body so that the housing can displace in the axial direction of the steering column during a secondary collision.

Furthermore, in the impact absorbing steering apparatus of the present invention there is a support plate section that is located on the portion that is fastened to the vehicle body at a position lower than the installation plate section on the housing side and that faces the installation plate section on the housing, such that the installation plate section on the housing can enter above the support plate section before the force for supporting the bracket on the housing side by the portion that is fastened to the vehicles body is lost, when the bracket on the housing side displaces in the forward direction due to a secondary collision.

For example, a capsule can be provided, the capsule formed by connecting the rear end edges of a top plate section and a bottom plate section together and supported by the portion fastened to the vehicle body, and holding the installation plate section between the top plate section and the bottom plate section so that the installation plate section on the housing side can displace in the forward direction due to a secondary collision, and at least the bottom plate section extends forward to a position where the bottom plate section can support the installation plate section on the housing side even when the bracket on the housing side is displaced in the forward direction due to a secondary collision, so that the bottom plate section functions as the support plate section.

Alternatively, a suspended arm can be provided on the portion that is fastened to the vehicle body above the bracket on the housing side, the suspended arm being formed by bending the middle section of a plate section that extends in the forward direction from the portion that is fastened to the vehicle body 180° downward and toward the rear, and comprising a suspended plate section and a bent back plate section, the suspended plate section and bend back plate section being separated from each other by a space, and the rear end edge of this bent back plate section can be located further toward the rear than the front end edge of the housing installation plate section being in a state where the force supporting the bracket on the housing side by the portion that is fastened to the vehicle body is lost, so that this bent back plate section functions as the support plate section.

Effect of the Invention

With the impact absorbing steering apparatus of the present invention, constructed as described above, it is possible to prevent the rear section of the steering column from displacing upward regardless of the occurrence of a secondary collision, even in the case of construction in which the housing for an electric power steering apparatus that is located on the front end section of the steering column drops away from a portion that is fastened to the vehicle body during a secondary collision.

In other words, with the construction of the present invention, before the force for supporting the bracket on the housing side by the portion that is fastened to the vehicle body is lost due to a secondary collision, an installation plate section on the housing side moves above a support plate section that is located in the portion that is fastened to the vehicle body. Therefore, it is possible to prevent the front section of the steering column from dropping excessively, and thus it is possible to keep the inclination angle of the steering column at nearly the proper value. As a result, together with being able to maintain the load required for the steering column to displace in the forward direction at nearly the design value, it is possible to prevent the steering wheel that is fastened to the rear end section of the steering shaft from raising more than the proper position. Consequently, it is possible to effectively protect the driver.

BEST MODES FOR CARRYING OUT THE INVENTION

Embodiment 1

Figure 1:
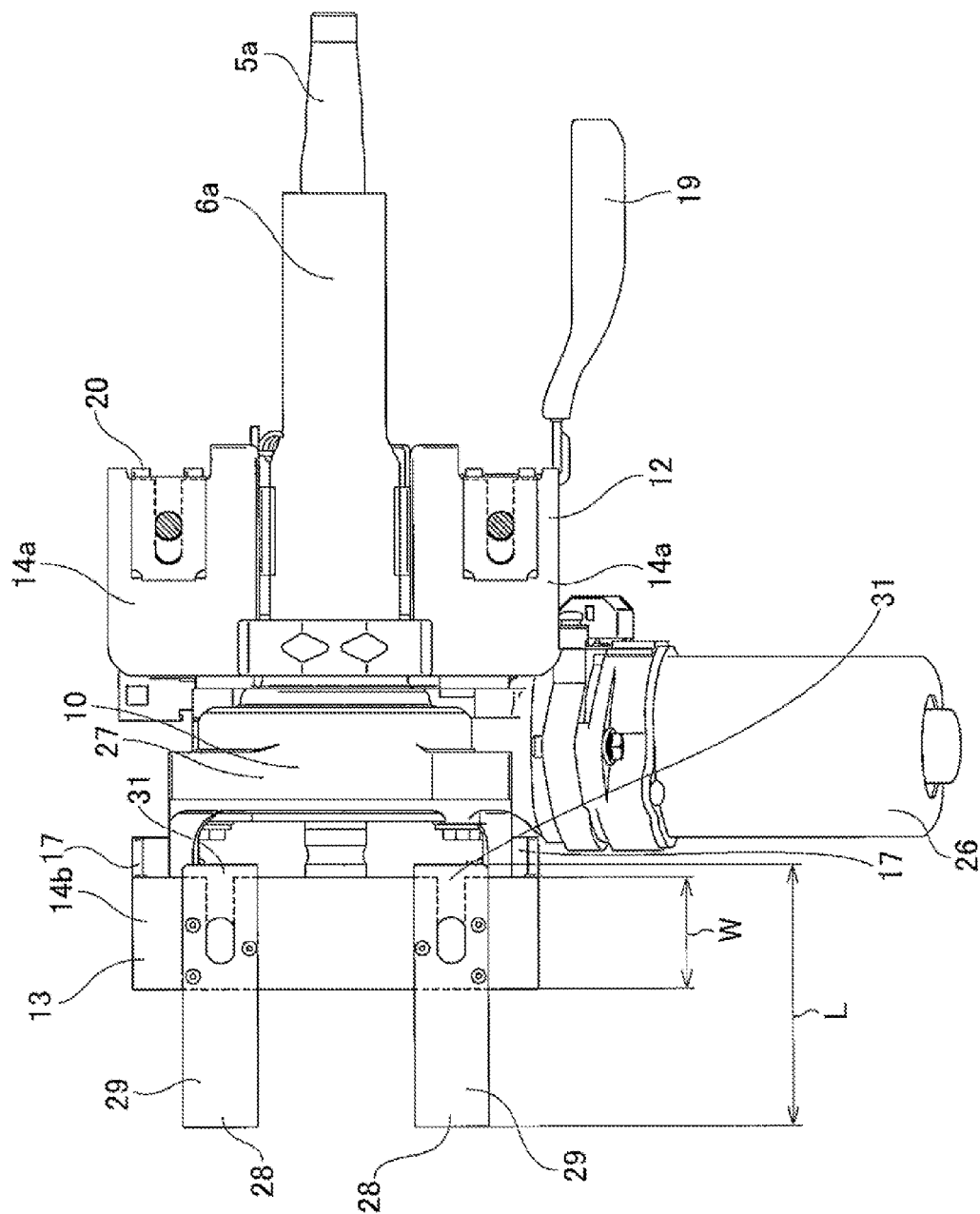
FIG. 1 is a top view illustrating the normal state of an apparatus of a first embodiment of the present invention.
Figure 2:
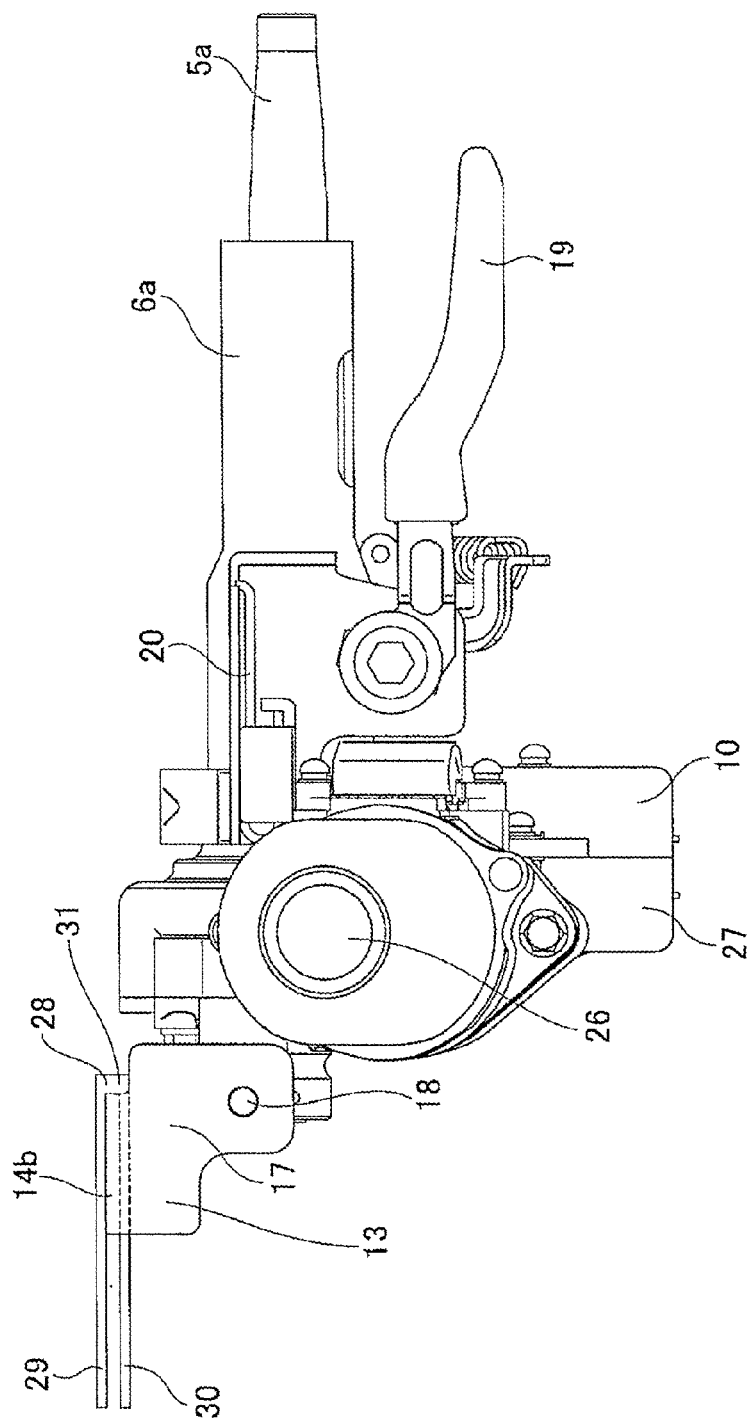
FIG. 2 is a side view of the normal state of the apparatus in FIG. 1.
Figure 3:
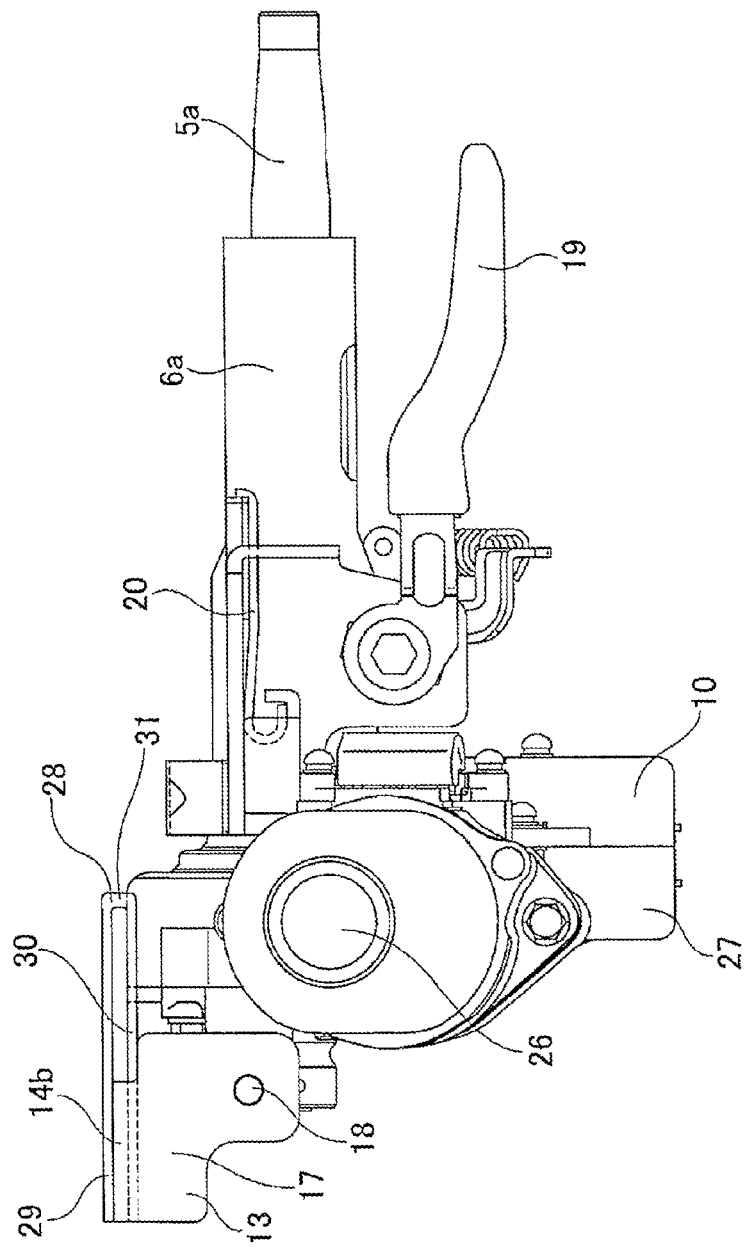
FIG. 3 is a side view of the apparatus in FIG. 1 in the state where a secondary collision has occurred.
Figure 7:
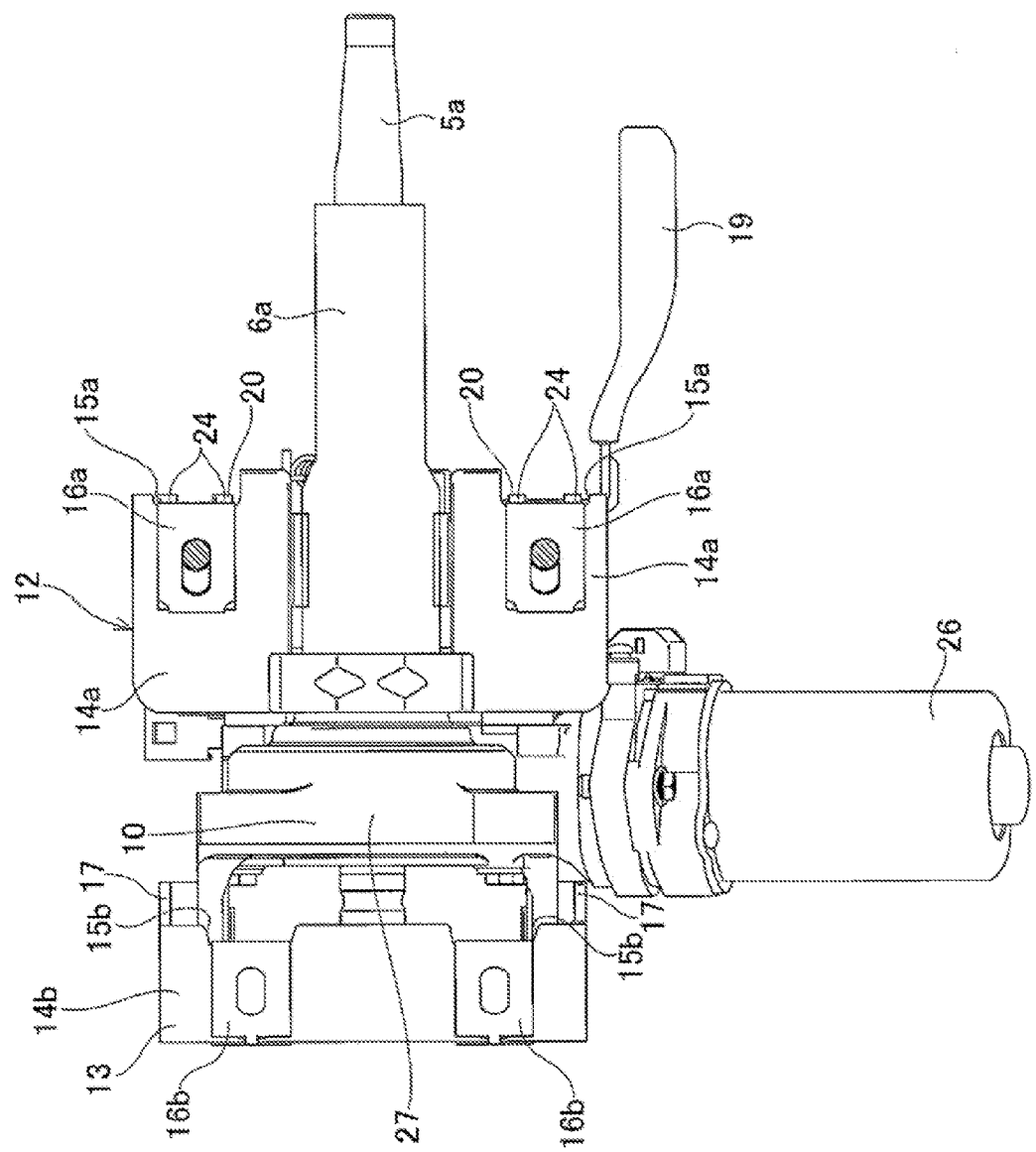
FIG. 7 is a top view illustrating the normal state of an example of a conventional impact absorbing steering apparatus comprising an electric power steering apparatus.
Figure 8:
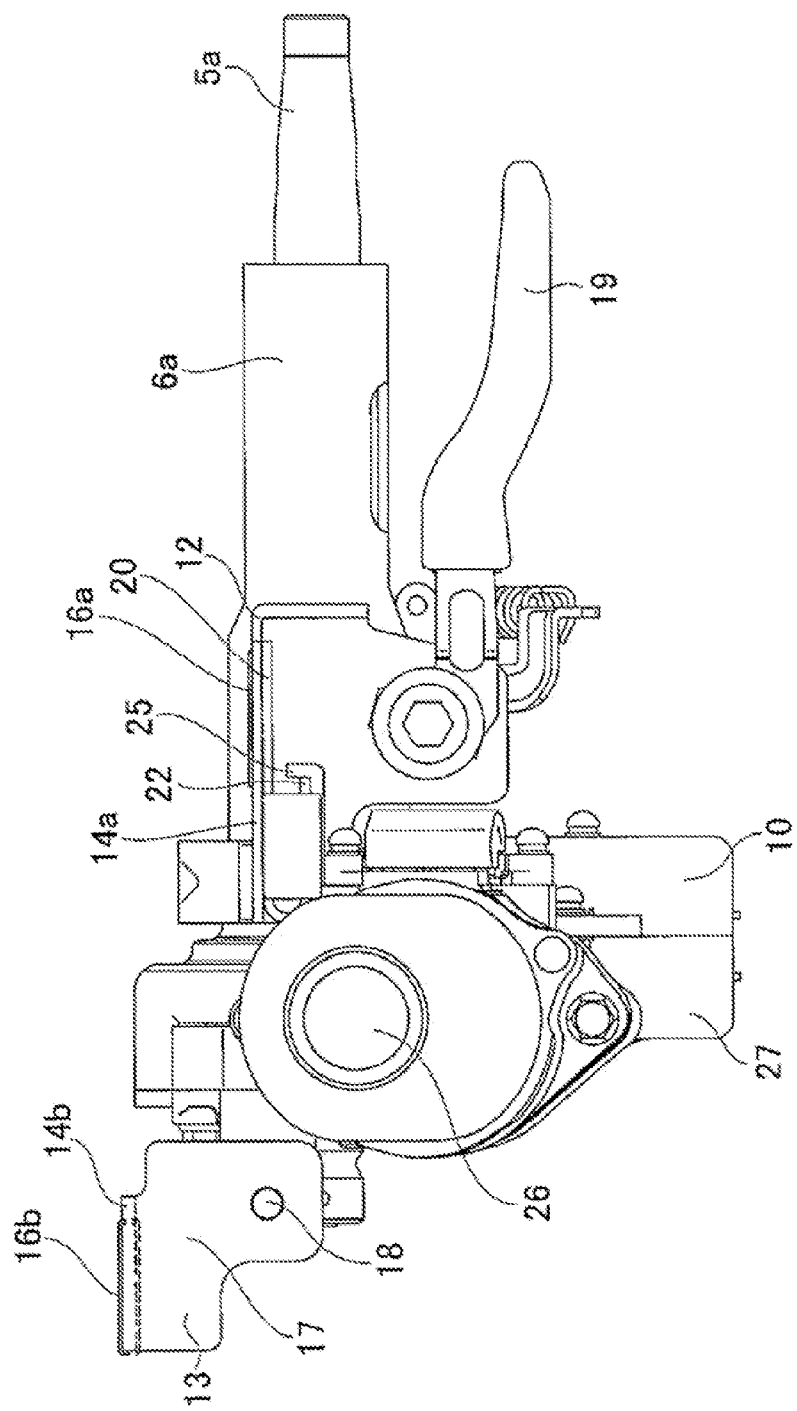
FIG. 8 is a side view illustrating the normal state of the apparatus in FIG. 7.
Figure 9:
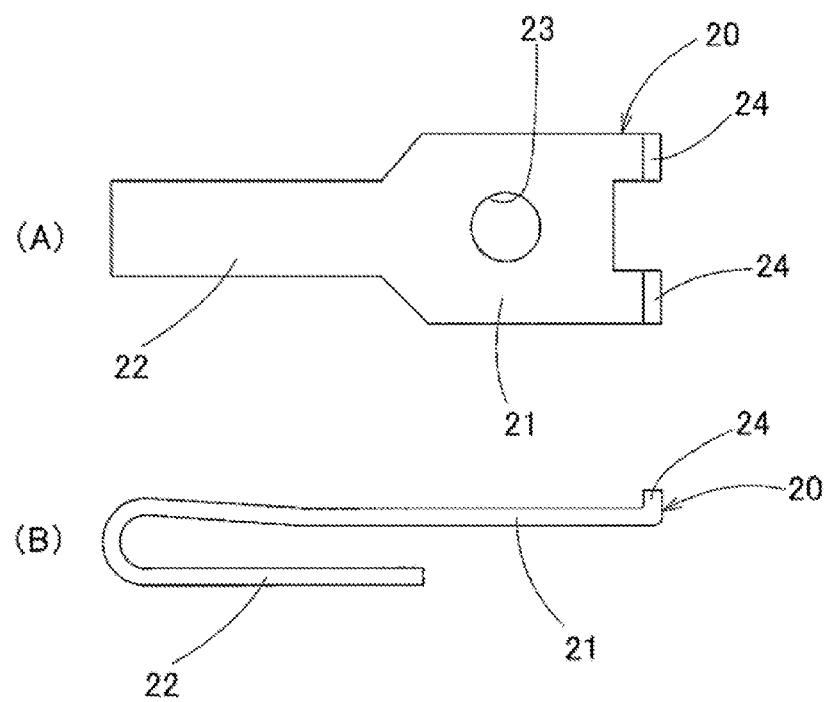
FIG. 9A is a top view and FIG. 9B is a side view illustrating an example of an impact absorbing member.
Figure 10:
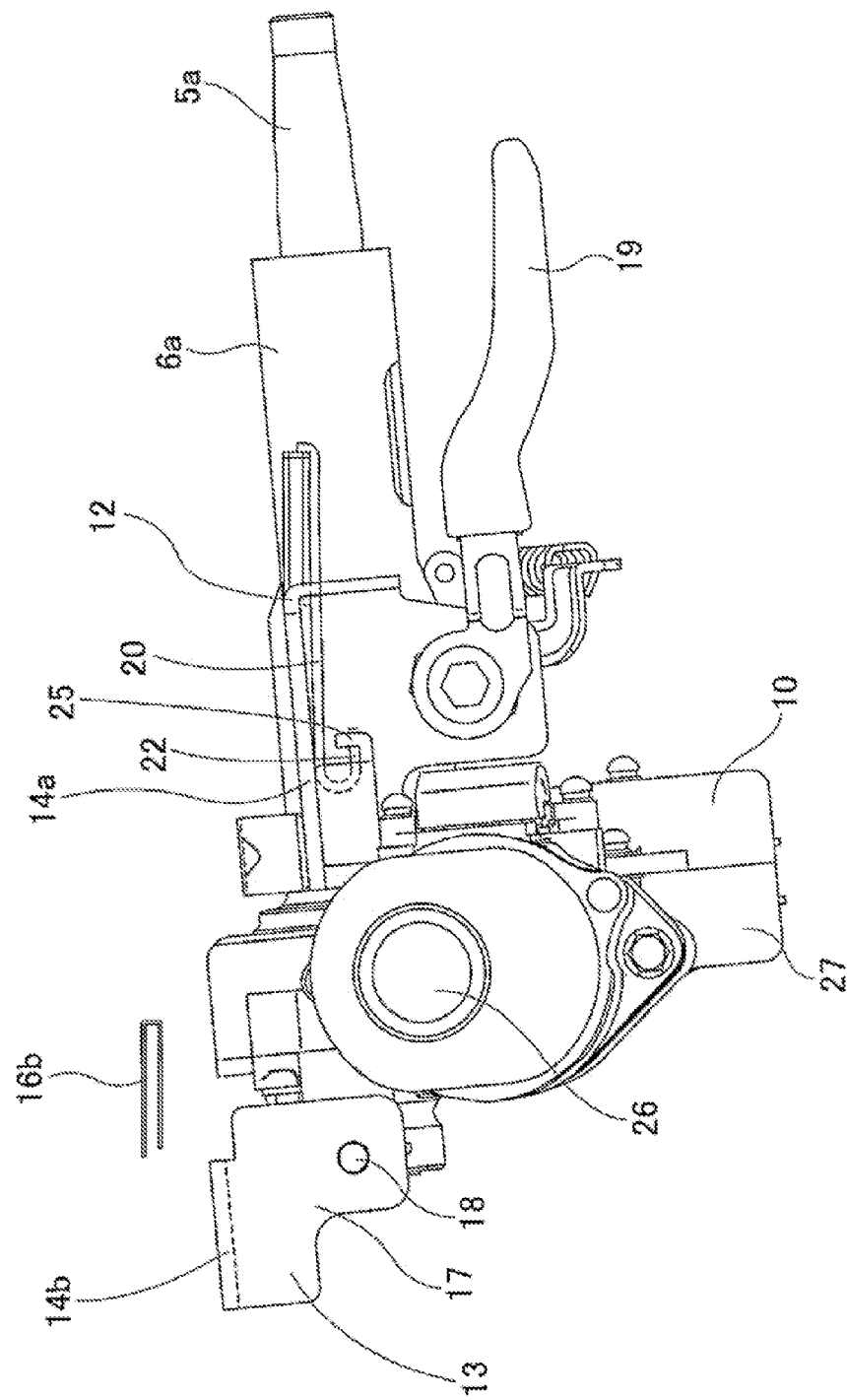
FIG. 10 is a side view for explaining the problem in the construction of the apparatus illustrated in FIG. 7.

FIG. 1 to FIG. 3 illustrate a first embodiment of the present invention. The characteristics of the impact absorbing steering apparatus comprising an electric power steering apparatus of this embodiment is the design of construction in which during a secondary collision, in order to prevent the angle of inclination of the steering column 6a from moving specified value, a bracket 13 on the housing side that is located on the front end section of the steering column 6a is supported by a bracket 11 on the vehicle side (see FIG. 4 and FIG. 5). The construction and function of the other parts is the same as the construction illustrated in FIG. 7 to FIG. 9, so the same reference numbers are used for identical parts, and any redundant explanation is omitted, with the explanation below centering on the characteristic features of this embodiment In the case of this embodiment, both end sections of the installation plate section 14b of the bracket 13 on the housing side are supported by the bracket 11 on the vehicle side by way of the capsules 28. These capsules 28 are made by die casting an aluminum alloy for example, and are into a horizontally long U shape that opens up toward the front by connecting a top plate section 29 and bottom plate section 30, which are separated from each other in the vertical direction, by connecting section 31. The capsules 28 having this kind of shape are connected to both end sections of the installation plate 14b such that they can be separated by impact loading during a secondary collision. In order for this, small through holes are formed in the top plate section 29, bottom plate section 30 and installation plate section 14b in portions that are aligned with each other, and the capsules 28 are fastened by pressure fitting support pins, which can be sheared by an impact load, into these small through holes. These support pins span between the capsules 28 and the installation plate 14b. The construction described above is also employed in a prior known impact absorbing steering apparatus.

Particularly, in the case of the construction of this embodiment, the length dimension L in forward and backward direction of the top plate section 29 and bottom plate section 30 of the capsules 28 is sufficiently larger than the width direction W in the forward and backward direction of the installation plate section 14b (L>W, and preferably L>2W). This installation plate section 14b is connected to the capsules 28 by support pins such that it is between the rear end sections of the top plate sections 29 and bottom plate sections 30 near the connecting sections 31, or in other words, it is held in the far end section of the space between these top plate sections 30 and the bottom plate sections 31 on the side far from the opening sections. Therefore, the front half sections of the top plates 29 and bottom plates 30 of these capsules 28 protrude sufficiently further toward the front than the front end edge of the installation plate section 14b.

When a secondary collision occurs, the pair of installation plate sections 14a of the bracket 12 on the column side drop away toward the front from the bracket 11 on the vehicle body side as the pair of energy absorbing members 20 plastically deform. At the same time, the installation plate section 14b of the bracket 13 on the housing side causes the support pins to shear, and displaces toward the front of the capsules 28. As described above, the top plate sections 29 and bottom plate sections 30 of these capsules always extend sufficiently toward the front more than the portions which sandwich and hold the installation plate section 14b in the normal state. Therefore, during a secondary collision, the bottom plate sections of the capsules 28 always exist underneath the portions near both ends of the installation plate section 14b even when the installation plate section 14b has displaced in the forward direction, so it is possible to prevent this installation plate section 14b from dropping. Therefore, it is possible to prevent the front section of the steering column 6a that supported the bracket 13 on the housing side from dropping an excessive amount, or in other words, more than the amount that the dropped amount due to the displacement in the axial direction of the steering column 6a, and thus it is possible to keep the angle of inclination of the steering column at the proper value. As a result, the load required for the steering column 6a to displace in the forward direction is maintained at near the design value, and it is possible to prevent the steering wheel that is fastened to the rear end section of the steering shaft 5a from raising higher than the proper position. Consequently, it is possible to effectively protect the driver.

Embodiment 2

Figure 4:
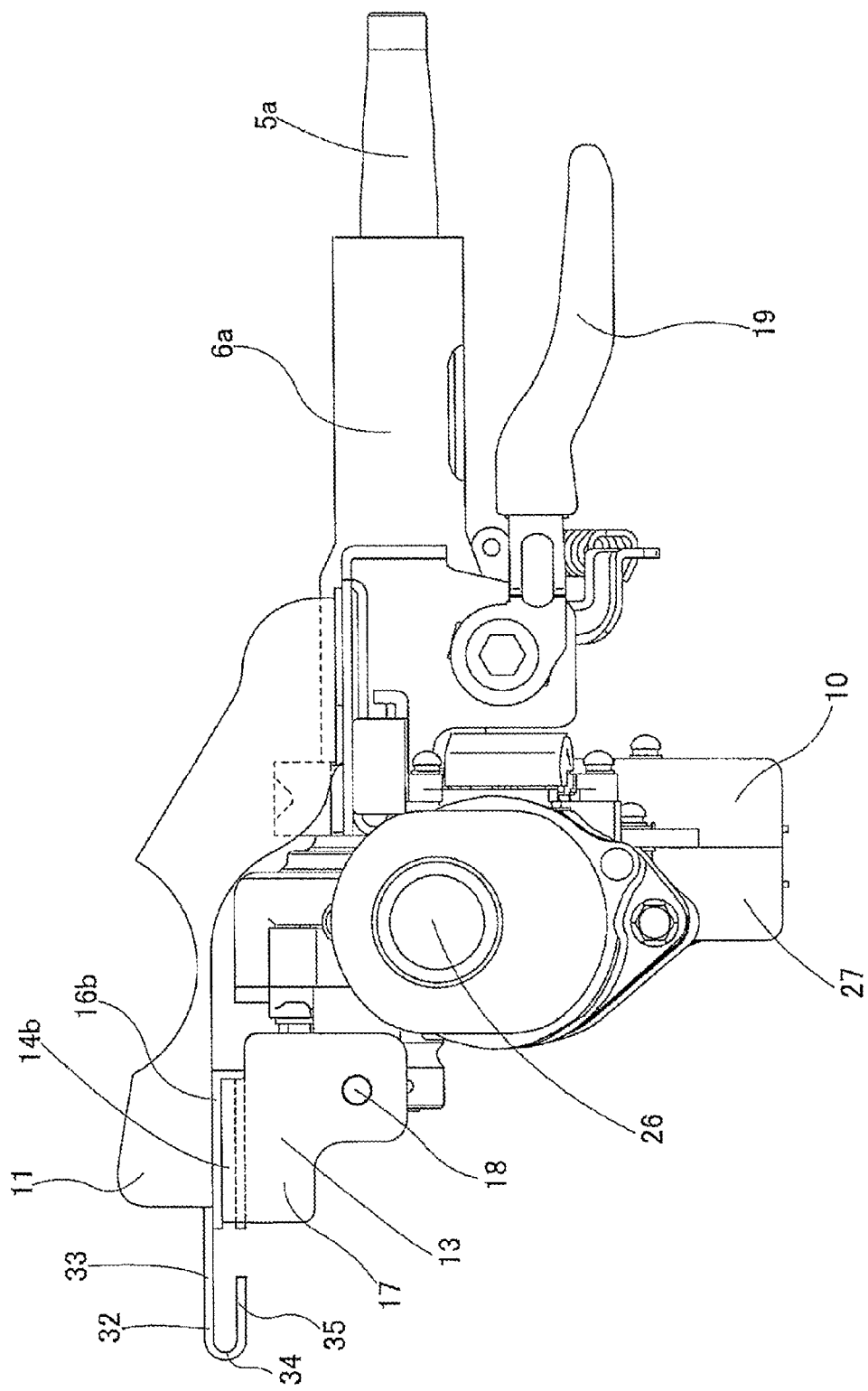
FIG. 4 is a side view of the normal state of a second embodiment of the present invention.
Figure 5:
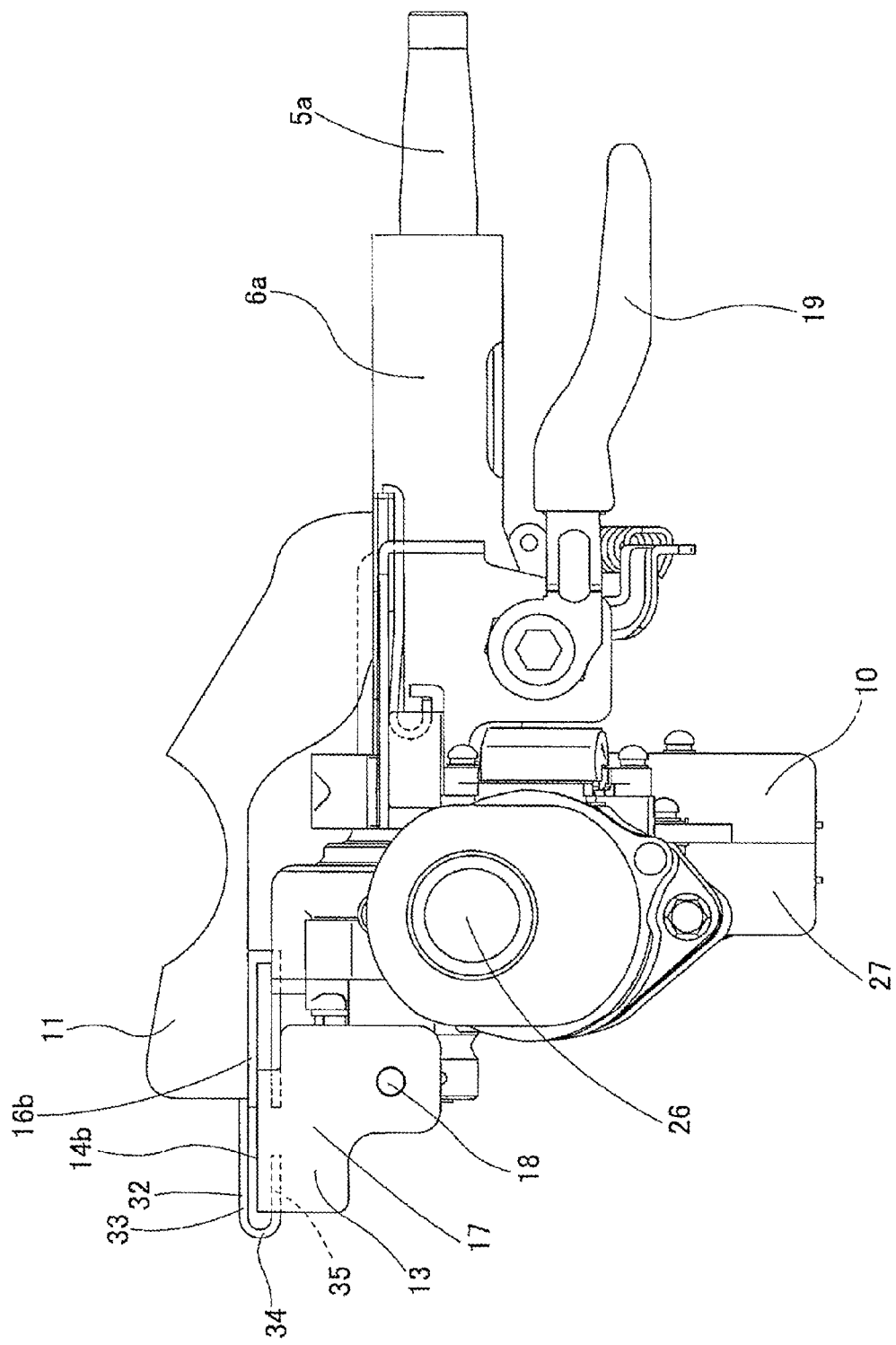
FIG. 5 is a side view of the apparatus in FIG. 4 in the state where a secondary collision has occurred.
Figure 6:
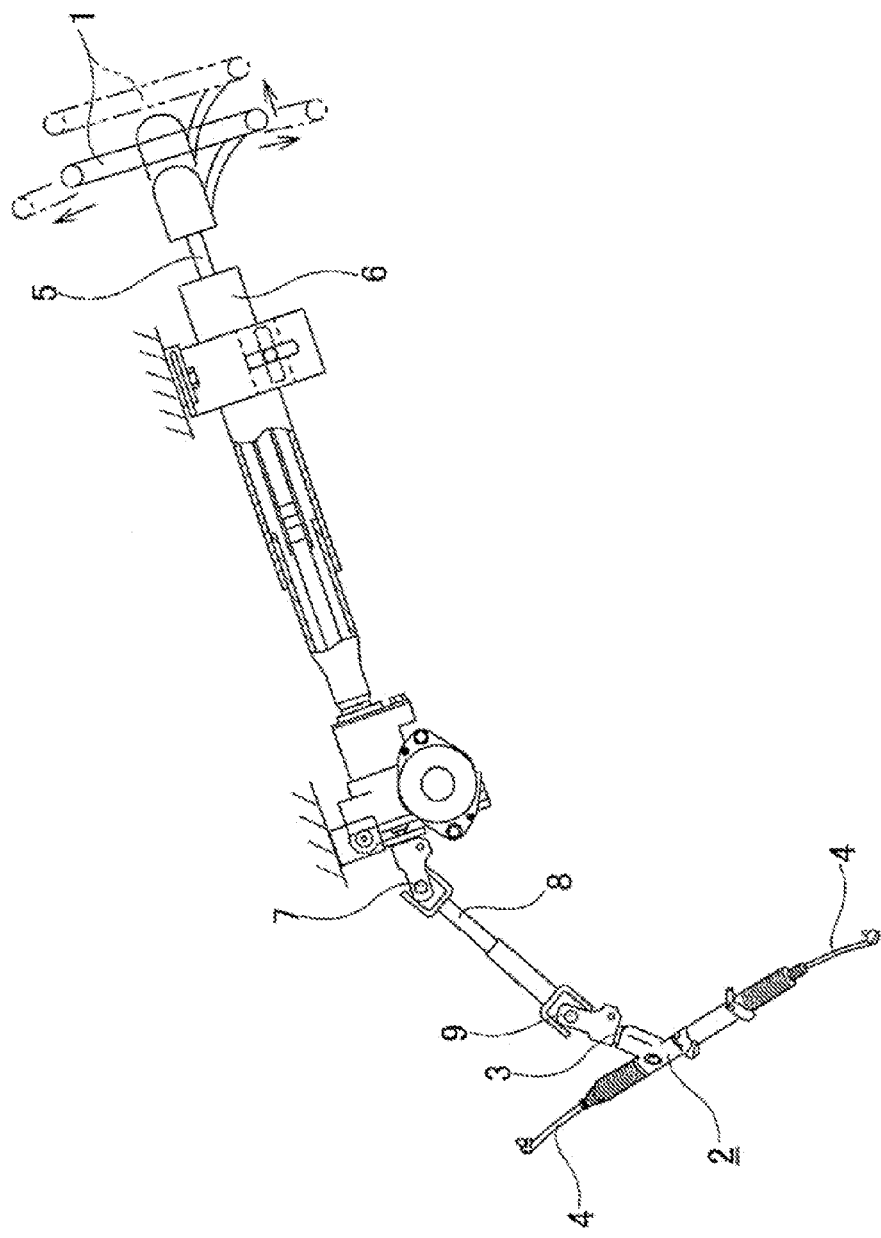
FIG. 6 is a partial cross-sectional view illustrating an example of a conventional steering apparatus.

FIG. 4 and FIG. 5 illustrate a second embodiment of the present invention. In the case of this embodiment, a suspended arm 32 is provided such that it is integrated with the bracket 11 on the vehicle side, and extends toward the front from the front end edge of the bracket 11 on the vehicle side, which corresponds to a portion that is fastened to the vehicle body of the present invention. This suspended arm 32 is J shaped as seen from the side, and comprises a suspended plate section 33, a curved plate section 34 and a bent back plate section 35. Of these, the suspended plate section 33 extends toward the front from the center section in the width direction of the front end edge of the base plate section (bottom plate section) of the bracket 11 on the vehicle side, and is essentially in the same plane as this base plate section. The curved plate section 34 is formed into a semi cylindrical shape by bending a portion which continues from the tip end edge (front end edge) of the suspended plate section 32 180° downward and toward the rear. Furthermore, the bent back plate section 35 is formed such that it continues toward the rear from the tip end edge (bottom end edge) of the curved plate section 34. This bent back plate section 35 can be formed such that it is mainly parallel with the suspended plate section 33. Alternatively, this bent back plate section 35 can be formed such that it is a little sloped with respect to the suspended plate section 33 in a direction such that the space between it and the suspended plate section 33 gradually increases.

In the case of this embodiment, the suspended arm 33 as described above prevents the bracket 13 on the housing side from dropping too much, or in other words more than the dropped amount due to the displacement in the axial direction of the steering column, during a secondary collision when the force for originally supporting the bracket 13 on the housing side by the bracket 11 on the vehicle side is lost, or in other words, when the force supporting bracket 13 by the bolts or studs that are inserted through the through holes in the cut out sections 15b and the sliding plates 16b is lost. In order for this, the tip end edge (rear end edge) of the bent back plate section 35 is brought close to and facing the front end edge of the installation plate section 14b of the bracket 13 on the housing in the normal state.

More specifically, during a secondary collision, before the installation plate section 14b comes apart from in the forward direction from between the top plate section and bottom plate section of the sliding plates 16b, and force for supporting the installation plate section 14b by the top plate section and bottom plate section of these sliding plates 16b is lost, the front section of the installation plate section 14b moves into the upper side of the rear section of the bent back plate section 35. Therefore, when the force for supporting the installation plate section 14b by the sliding plates 16b is lost, the bent back plate section 35 supports the installation plate section 14b, so it is possible to prevent the front section of the steering column 6a from dropping excessively, and thus it is possible to effectively protect the driver.

The support plate section for causing the front section of the installation plate section 14b to enter the bottom side before the force for supporting the bracket 13 on the housing side is lost is the same as that in the first embodiment except for the bent back plate section 35 of the suspended arm 32, so an explanation of equivalent parts is omitted.

When embodying the present invention, it is not necessary to install a tilting mechanism as in the example in the figures. In other words, the present invention can be applied to construction in which the vertical position of the steering wheel cannot be adjusted. On the other hand, it is also possible to apply the present invention to combined construction comprising a telescoping mechanism for adjusting the forward and backward position in addition to the tilting mechanism for adjustment of the vertical position of the steering wheel. In this case, a combination of an inner column and outer column, which can be extended or contracted, is used as the steering column. Furthermore, the present invention can also be applied to construction in which the tilting mechanism is omitted and there is only a telescoping mechanism.

INDUSTRIAL APPLICABILITY

The present invention can be widely used in a steering apparatus for an automobile, and more specifically in an impact absorbing steering apparatus that, during a collision accident, allows the steering wheel to displace in the forward direction while absorbing impact energy that is applied to the steering wheel from the body of the driver, and more particularly to an impact absorbing steering apparatus having construction wherein the electric motor of an electric power steering apparatus is provided such that it protrudes from one side in a portion that displaces in the forward direction together with the steering wheel.

EXPLANATION OF REFERENCE NUMBERS

1 Steering wheel
2 Steering gear unit
3 Input shaft
4 Tie rod
5, 5a Steering shaft
6, 6a, 6b, 6c Steering column
7 Universal joint
8 Intermediate shaft
9 Universal joint
10 Housing
11 Bracket on the vehicle side
12 Bracket on the column side
13 Bracket on the housing side
14a, 14b Installation plate sections
15a, 15b Cut out section
16a, 16b Sliding plate
17 Support side plate section
18 Pivot section
19 Tilt lever
20 Energy absorbing member
21 Base plate section
22 Plastic deforming section
23 Circular hole
24 Restraining piece
25 Anchor plate section
26 Electric motor
27 Electric power steering apparatus
28 Capsule
29 Top plate section
30 Bottom plate section
31 Connecting section
32 Suspended arm
33 Suspended plate section
34 Curved plate section
35 Bent back plate section

The invention claimed is:

1. An impact absorbing steering apparatus adapted for installation on a vehicle body defining forward and rearward directions, the impact absorbing steering apparatus comprising:

a steering column located on a column side of the impact absorbing steering apparatus, the steering column having a front end toward the forward direction of the vehicle body, a rear end toward the rearward direction of the vehicle body, an inside between the front and read ends, an opening at the rear end, and an axis that defines an axial direction;

a steering shaft that is rotatably supported on the inside of the steering column, the steering shaft having a rear end section that protrudes from the opening on the rear end of the steering column and is adapted to support and fasten to a steering wheel;

a first bracket on the column side of the impact absorbing steering apparatus, the first bracket being supported by the steering column and adapted to fasten the steering column to the vehicle body so that the steering column can displace in the axial direction thereof during a secondary collision;

an electric power steering apparatus that comprises a housing located on a housing side of the impact absorbing steering apparatus and supported by the front end of the steering column, and an electric motor supported by and fastened to the housing, wherein the electric motor functions as a power source that provides auxiliary torque for rotating the steering shaft;

a member adapted to be fastened to the vehicle body, to support the housing, and fasten the housing to the vehicle body so that the housing can displace in the axial direction of the steering column during the secondary collision;

a second bracket on the housing side of the impact absorbing steering apparatus, the second bracket comprising an installation plate section having a forward region, the installation plate section being connected to a portion of the member adapted to be fastened to the vehicle body so that the installation plate section can drop away toward the forward direction of the vehicle body due to an impact load in the forward direction during the secondary collision; and a support plate section that is formed on the member, located at a position below the forward region of the installation plate section so as to have a portion that faces the installation plate section in a direction transverse to the axial direction of the steering column, the installation plate section being capable of moving over the portion of the support plate section facing the installation plate section from a first position to which the installation plate section is connected in a normal state, wherein the member continues to support the second bracket when the installation plate section is displaced from the first position in the forward direction due to the secondary collision.

2. The impact absorbing steering apparatus according to claim 1, wherein the member comprises a capsule fastened to the vehicle body, the capsule comprising a top plate section and a bottom plate section connected at a rear section of the capsule, the installation plate section being located between the top plate section and the bottom plate section in the rear section of the capsule when in the first position so that the installation plate section can displace in the forward direction due to the secondary collision, wherein at least the bottom plate section extends in the forward direction and supports the installation plate section when the second bracket is displaced from the rear section of the capsule in the forward direction due to the secondary collision, wherein the bottom plate section functions as the support plate section.

3. The impact absorbing steering apparatus according to claim 1, wherein the member comprises a suspended arm having a portion thereof located above the second bracket and fastened to the vehicle body, the suspended arm extending in the forward direction from the portion fastened to the vehicle body to define a suspended plate section and bending downward and toward the rearward direction to define a bent back plate section and a rear end edge thereof, the suspended plate section and bend back plate section being separated from each other by a space, wherein the rear end edge of the bent back plate section faces and is proximate to the forward region of the installation plate section in the first position, wherein the bent back plate section functions as the support plate section.

* * * * *